April 18, 1950     V. F. ZAHODIAKIN     2,504,914
SEGMENTAL PISTON RING
Filed Feb. 27, 1946

INVENTOR.
Victor F. Zahodiakin
BY
Wood, Arey, Herron & Evans
ATTORNEYS

Patented Apr. 18, 1950

2,504,914

UNITED STATES PATENT OFFICE 2,504,914

SEGMENTAL PISTON RING

Victor F. Zahodiakin, Short Hills, N. J.

Application February 27, 1946, Serial No. 650,485

6 Claims. (Cl. 309—45)

This invention relates to improvements in piston rings of the segmental type made from sheet metal or the like and designed to exert a uniform radial pressure against the cylinder wall. The improved ring is intended particularly for the pistons of internal combustion engines preferably as an oil control ring but is not limited to this use alone. It is capable of installation with equal facility and advantage, on the pistons of steam engines, pumps and similar applications employing packings of this nature.

It has been an object of the inventor to provide a piston ring which is installed in the cylinder under compression and exerts a relatively uniform degree of pressure, so as to flex and conform to any irregularity of the cylinder wall either general or local, and which is therefore particularly advantageous as a seal for irregularly worn or out of round cylinders.

It has been a further object of this inventor to provide a piston ring fabricated from light gauge sheet metal by means of relatively simple blanking and forming operations. Preferably these rings are to be formed on an automatic punch press thus providing for inexpensive mass production methods of manufacture.

Specifically, the ring consists of an annular band including a series of segments, the segments being divided by relatively minute gaps or crevices for permitting contraction and expansion. The series of gaps in the aggregate, provides the same or less clearance than the single gap of the conventional machined piston ring. Thus the gap, in effect, is divided and distributed and the presence of lubricating oil in the relatively tiny crevices tends to seal them. Additionally, this segmental arrangement provides increased flexibility, permitting portions of the ring to flex independently, to conform to local cylinder wall irregularities.

It is the concept of the inventor to provide a ring bent from a single strip of sheet metal and made up of segments disposed in circumferential arrangement, the segments connected by integral spring portions exerting an expanding force so that the ring exerts either circumferential or radial pressure, or both, against the cylinder wall. Thus the segments, either individually or in grouped relationship, are free to flex independently to conform to local variations of the cylinder wall as well as to general irregularities, such as an out of round condition. The ring is extremely flexible, is readily compressed for installation and will promptly adjust itself to the cylinder contour without being individually fitted.

Other objects and advantages of the invention will be more fully apparent from a description of the drawings in which.

Figure 1:
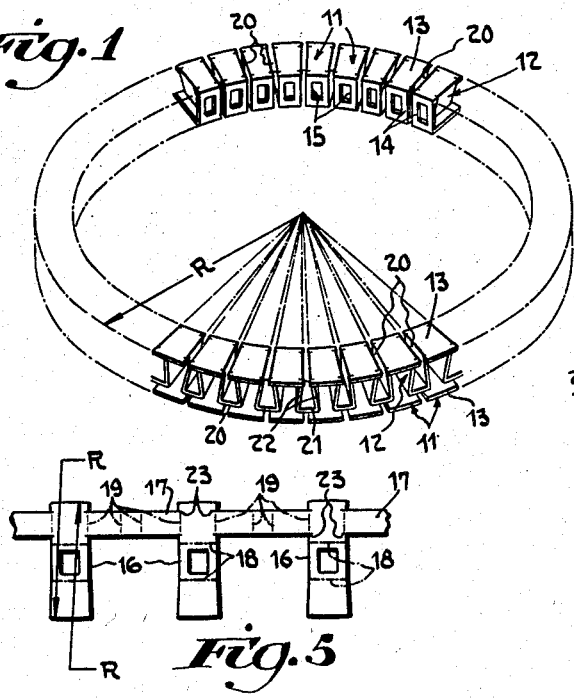
Figure 1 is a perspective view illustrating the improved piston ring in expanded condition prior to installation in an engine.
Figure 2:
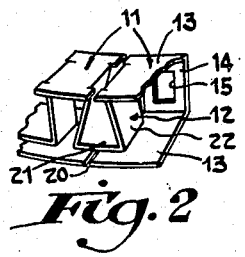
Figure 2 is an enlarged fragmentary perspective view further detailing the construction of the ring.
Figure 3:
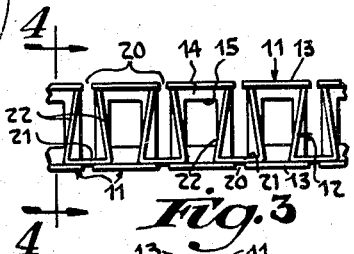
Figure 3 is an enlarged fragmentary side view further detailing the construction of the ring.
Figure 4:
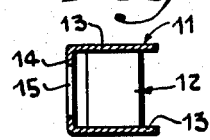
Figure 4 is a cross sectional view taken on line 4—4 Figure 3.

Referring to Figure 1 of the drawings, the ring as shown, constitutes a plurality of segments 11 each joined by an integral corrugation or spring loop 12. As shown in Figure 4, each segment 11 is U-shaped in cross section constituting parallel horizontal upper and lower walls or arms 13 joined by a vertical wall 14. The wall 14 is disposed toward the interior of the ring with the open side of the segment facing outwardly, the spring loop 12 extending vertically between the arms 13. As viewed in Figure 4, the loops 12 are slightly narrower than the arms 13 in radial dimensions thus disposing the inner and outer edges of the loops interiorly of the inner and outer edges of the segments, thus the outer edges are free and clear of the cylinder wall when the ring is installed in the engine.

In order to permit the passage of lubricating oil through the ring, the vertical wall 14, preferably of each segment, includes an opening 15. This permits the oil to pass from the cylinder wall through the open face of the ring, through the opening 15, to the ring groove of the piston and thence to the interior of the piston in the conventional manner, thus preventing the oil from reaching the combustion chamber.

Figure 5:
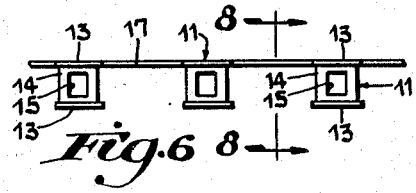
Figure 5 is a plan view showing a portion of the sheet metal blank prior to the forming or bending operations necessary to make up a piston ring.
Figure 8:
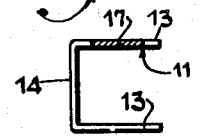
Figure 8 is a sectional view taken on line 8—8 Figure 6 further illustrating the structure of the ring in the forming operation shown in Figure 6.

As shown in Figure 5, the ring is first blanked or stamped from sheet steel of a suitable grade and thickness as a one-piece flat strip including a series of laterally extending sections 16. These are designed to be bent to form the segments 11. Each of the lateral sections 16 is connected by an integral strip 17 which is subsequently bent to form a spring loop 12. After the initial blanking operation the lateral sections 16 are bent along the lines 18—18 by means of suitable dies to form the U-shaped segments 11 as shown in Figures 6 and 8.

Figures 6, 7:
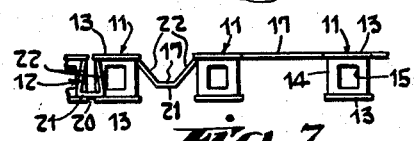
Figure 6 is a side view showing the blank partially formed.
Figure 7 is a side view similar to Figure 6 showing the subsequent forming operations which complete the ring.

The strip 17 is now bent along the lines 19 in the manner shown in Figure 7, the strip being corrugated in effect to form the triangular shaped spring loop 12. By virtue of this operation the segments 11 are brought together so that the adjacent arms 13 are closely related, with a minute clearance or gap 20 between the adjacent edges thereof. This slight gap permits contraction of the rings, the effect being cumulative to permit the ring to adjust itself to irregularities of the cylinder wall. It has been determined that a gap of .004" to .005" is sufficient for this purpose. In the drawings the gaps are exaggerated for purposes of illustration since it would be impossible to show clearances of the dimensions above set forth.

The spring loop 12 includes horizontal section 21 joining pairs of converging limbs 22, the limbs joining the upper arms 13 of adjoining segments. The sections 21 of the spring loops lie upon the interior surface of the lower arms 13, spanning the gap 20 between adjacent segments. The converging limbs 22 thus serve as spacers between the upper and lower arms 13 to brace and maintain the proper spacing thereof.

It will be observed that the lateral sections 16 at their juncture with the strip 17, are slitted as at 23, this in effect extending the strip 17 slightly past the edge of section 16. This compensates for the metal thickness of the spring loops at the lines of bend so that the edge of the clip is set back from the edge of the arm 13 thus avoiding interference at the gap and permitting the edges to contact each other if forced together.

As shown in Figures 1 and 5, the edges of the arms 13 of segments 11 are formed on lines radial to the center of the ring so that the gap therebetween is radial to the center. Thus if two adjacent segments are in contact the gap would be closed and appear as a line radial to the center.

In order to conform to the cylinder bore upon installation, the respective opposite ends of the arms 13 are formed on a radius corresponding to the radius of the cylinder bore. Thus as illustrated in Figure 1 the cylinder bore radius is of the same dimension as the radii of the ends of the arms 13 as indicated respectively at R.

After forming, the opposite ends of the ring may be joined preferably by butt welding to form a unitary structure. The ring is then heat treated by a process suitable to the particular alloy used and is preferably drawn to reduce brittleness. After heat treatment the ring may be ground or lapped to produce a fine finish and an appropriate fit for the cylinder bore.

Figure 9:
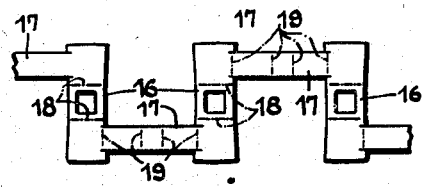
Figure 9 is a fragmentary plan view similar to Figure 5 showing the blank for a modified form of piston ring.

The fabrication shown in Figures 1 to 8 inclusive may be designated as a single acting ring since the expanding circumferential force of the spring loops is exerted upon the top arms 13 only. In the modification of this form, shown in Figures 9 and 10, the spring loops 12 are disposed so as to exert pressure alternatively upon the upper and lower arms 13. This is accomplished in blanking by offsetting the strip 17 so as to join alternate ends of the lateral extensions 16 as shown in Figure 9.

Figure 10:
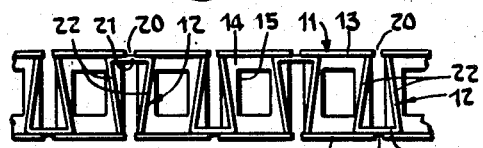
Figure 10 is a side view similar to Figure 3 showing the completed piston rings of the modified form after the several bending and forming operations.

In forming this ring, the procedure is substantially the same as that of the single acting ring except that the converging limbs 21 of the spring loops join alternately with upper and lower arms 13 as shown in Figure 10. In this arrangement therefore the expanding force is divided between the upper and lower arms although the number of spring loops is substantially the same.

Having described my invention, I claim:

1. A piston ring comprising a continuous strip of resilient sheet metal bent to provide a series of segments forming an annular band, the segments being of U configuration in radial cross section with parallel arms thereof extended outwardly of the ring, the lateral edges of the arms being joined by integral spring sections as a continuation thereof connecting adjoining segments.

2. A piston ring comprising a single strip of resilient sheet metal formed to provide a series of segments constituting an annular band, each of the segments being of U configuration in radial cross section with the top and bottom arms thereof extended outwardly of the ring, the segments being joined by spring loops integral with the top arms of the segments and disposed between adjoining segments interiorly thereof, the spring loops tending to expand the ring circumferentially.

3. A piston ring comprising a one piece strip of resilient sheet metal bent to form a series of adjoining segments arranged to form an annular band, each of the segments being of U configuration in radial cross section with the arms of the U extending outwardly of the ring and the inwardly dispoed connecting portion of the U having an oil flow opening therein, the arms of adjoining segments being connected by a spring loop forming a continuation thereof, the spring section being narrower than the arms and of triangular form.

4. A piston ring comprising angularly arranged sections, each of such sections being of U-shape, said U-shaped sections having their open ends disposed outwardly and their arms constituting the top and bottom wall surfaces of the piston ring, said sections connected by means of loops of spring steel, the respective ends of each loop being connected to the adjacent radially disposed edges of the arms of adjacent sections, said loops being disposed perpendicularly relative to the arms of said sections and the outer ends of the loops contacting the adjacent arms of the sections whereby the loops space and support the arms of the respective sections.

5. A piston ring comprising a series of circumferentially arranged sections, said sections being U-shaped in radial cross section and providing upper and lower arms, spring loops connecting the sections, said loops having their ends formed integrally with adjacent side edges of the arms of adjacent sections and their outer ends in engagement with the opposite arms of the respective sections, said loops alternately attached to the upper arms of the sections and to the lower arms of the sections.

6. A piston ring comprising a one piece strip of resilient sheet metal formed to provide a series of segments arranged in an annular band, each of the segments being of U configuration in radial cross section with the arms of the U extending outwardly of the ring, the segments being joined by spring loops generally triangular in shape and forming a continuation of the upper arms of the segments, each loop including a pair of converging limbs with each limb extending between the respective upper and lower arms of a segment, and a base portion overlapping and contacting the lower arms of adjacent segments.

VICTOR F. ZAHODIAKIN.

REFERENCES CITED

The following references are of record in the file of this patent:

UNITED STATES PATENTS

| Number | Name | Date |
| --- | --- | --- |
| 2,345,589 | Englehardt | Apr. 4, 1944 |
| 2,397,636 | Zahodiakin | Apr. 2, 1946 |